(12) United States Patent
Kan et al.

(10) Patent No.: US 7,849,414 B2
(45) Date of Patent: Dec. 7, 2010

(54) EDGE ANTI-ALIASING

(75) Inventors: Alex Kan, Mountain View, CA (US);
Michael J. E. Swift, Mountain View, CA (US); Sean Gies, San Fransisco, CA (US); Loren Brichter, San Jose, CA (US); Christopher Niederauer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 729 days.

(21) Appl. No.: 11/770,643

(22) Filed: Jun. 28, 2007

(65) Prior Publication Data

US 2008/0320414 A1 Dec. 25, 2008

Related U.S. Application Data

(60) Provisional application No. 60/945,892, filed on Jun. 22, 2007.

(51) Int. Cl.
*G06F 13/00* (2006.01)
*G06F 15/00* (2006.01)

(52) U.S. Cl. .................................... 715/768; 715/764
(58) Field of Classification Search ......... 715/762–765, 715/837–839, 767–768, 502, 744, 851–854, 715/711–715
See application file for complete search history.

(56) References Cited

U.S. PATENT DOCUMENTS

| 7,478,129 | B1 * | 1/2009 | Chemtob | 709/204 |
| 7,536,645 | B2 * | 5/2009 | Ducharme | 715/744 |
| 2005/0044485 | A1 * | 2/2005 | Mondry et al. | 715/502 |

\* cited by examiner

*Primary Examiner*—Cao (Kevin) Nguyen
(74) *Attorney, Agent, or Firm*—Blakely, Sokoloff, Taylor & Zafman LLP

(57) ABSTRACT

Techniques for anti-aliasing of graphical objects. A graphical object to be displayed on a display image may be modified to include a border region at least partially surrounding the object. The color of the border region may be selected based on the color of the background over which the graphical object is to be displayed. The graphical object is linearly filtered. The linearly filtered graphical object is displayed on a display device.

18 Claims, 4 Drawing Sheets

EDGE ANTI-ALIASING

TECHNICAL FIELD

The invention relates to display devices. More particularly, the invention relates to techniques for efficient edge anti-aliasing that may be used to provide output signals to a display device.

BACKGROUND

In digital signal processing, sampling and/or other processing factors may result in aliasing or distortion in a displayed image. The result may be an image having noticeable defects. This may be distracting to a viewer.

Anti-aliasing refers to techniques to reduce the aliasing in an image. Techniques for anti-aliasing have been developed and may include filtering or other signal processing. However, these signal processing techniques require system resources and may reduce overall system performance.

SUMMARY

Techniques for anti-aliasing of graphical objects are disclosed. In one embodiment, a graphical object to be displayed on a display image is modified to include a border region at least partially surrounding the object. The color of the border region is selected based, at least in part, on the color of the background over which the graphical object is to be displayed. The graphical object is linearly filtered. The linearly filtered graphical object is displayed on a display device.

In one embodiment, the border region is transparent. In one embodiment, alpha blending is performed on the graphical object. In one embodiment, the graphical object is an artistic facsimile. In one embodiment, the artistic facsimile is album artwork. In one embodiment, the border region includes a texture from a texture palette. In one embodiment, the color of the border region is approximately the same as the color of the background.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques for approximating the effects of edge anti-aliasing on textured graphical objects by padding the texture around the edges of the object and rendering with linear filtering. In the general case, object edges may be padded with transparency and rendered with alpha blending enabled. For situations where the object is to be drawn over a colored background, the padding is in the background color, which may eliminate the need for alpha blending.

Linearly filtering the textures may allow use of the graphics hardware texture sampling capabilities to smooth the transition between the object and the background, as averaging (or otherwise processing) the object texture and the edge padding may approximate the coverage of the object's edge pixels. Also, because the approximate coverage can vary smoothly between 0 and 1, rather than being a function of the number of samples covered, stairstepping is reduced.

For objects rendered with linear filtering, this technique may reduce the cost of smooth edges. For linearly filtered objects against a solid background, there may be no additional hardware cost. Overall, this may greatly reduce the impact of anti-aliasing in terms of computation and memory bandwidth utilization.

Figure 1:
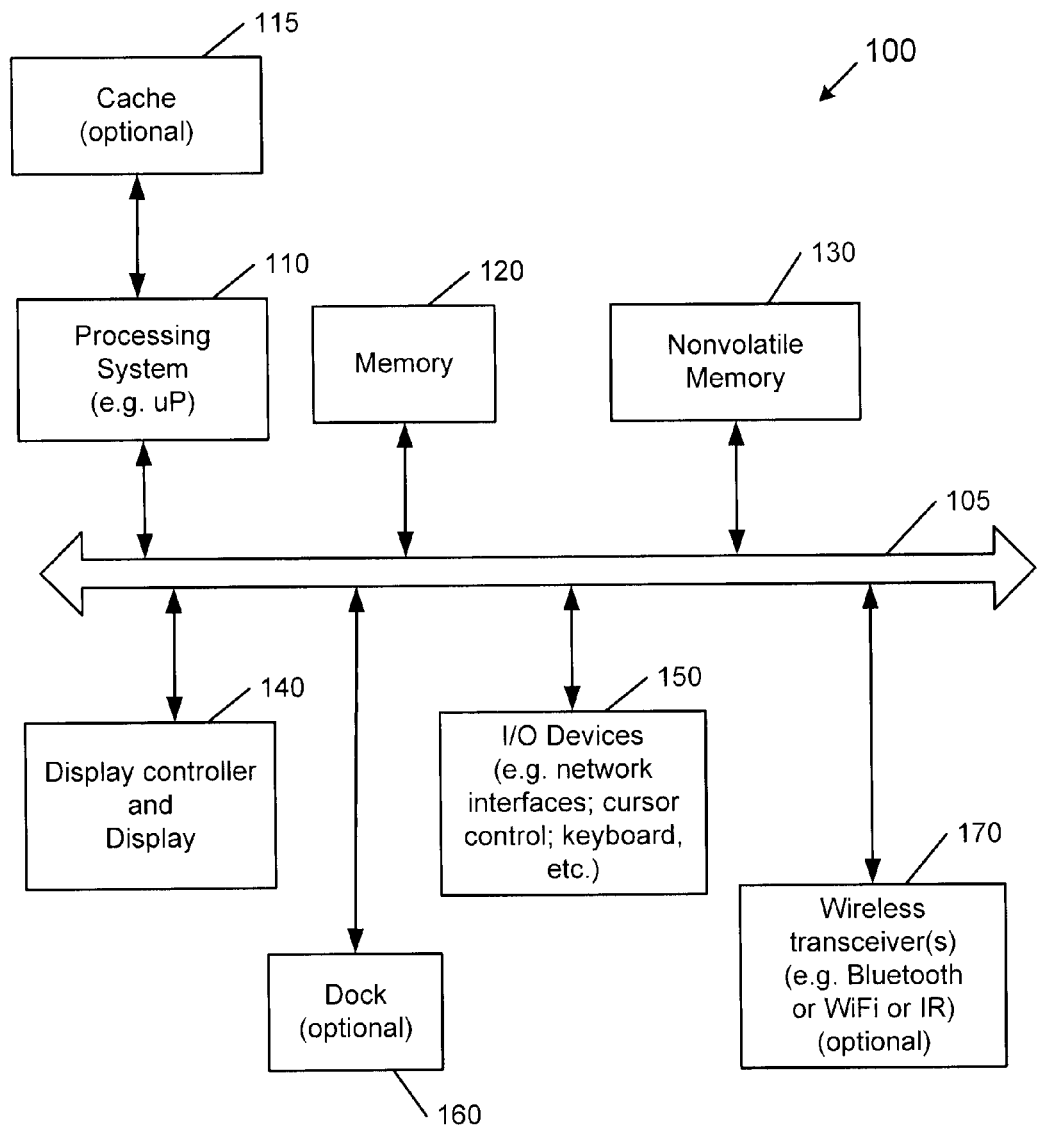
FIG. 1 is a block diagram of one embodiment of a data processing system.

FIG. 1 is a block diagram of one embodiment of a data processing system. Note that while FIG. 1 illustrates various components of a computer system, it is not intended to represent any particular architecture or manner of interconnecting the components as such details are not germane to the present inventions. Other systems including, for example, personal digital assistants (PDAs), cellular telephones, media players (e.g. an iPod), a smartphone, devices which combine aspects or functions of these devices (a media player combined with a PDA and a cellular telephone in one device), network computers, an embedded processing device within another device, and other data processing systems which have fewer components or perhaps more components may also be used to implement one or more embodiments of the present inventions and may be one or more of the data processing systems described herein.

Computer system 100 includes bus 105 which is coupled to one or more microprocessors which form processing system 110. Bus 105 is also coupled to memory 120 and to a non-volatile memory 130, which may be a magnetic hard drive in certain embodiments, or flash memory in other embodiments. Bus 105 is also coupled to display controller and display 140 and one or more input/output (I/O) devices 150.

Further, bus 105 may be coupled to optional dock 160 and to one or more wireless transceivers 170, which may be a Bluetooth® compliant transceiver or a WiFi compliant transceiver or an infrared transceiver. Wireless transceivers 170 are optional as shown in FIG. 1.

Processing system 110 may optionally be coupled to cache 115. Processing system 110 may include one or more microprocessors, such as a microprocessor from Intel or IBM. Bus 105 interconnects these various components together in a manner which is known in the art. Typically, the input/output devices 150 are coupled to the system through input/output controllers.

Memory 120 may be implemented as dynamic RAM (DRAM) which provides fast access to data but requires power continually in order to refresh or maintain the data in memory 120. Non-volatile memory 130 may be a magnetic hard drive or other non-volatile memory which retains data even after power is removed from the system. While FIG. 1 shows that non-volatile memory 130 is a local device coupled directly to the rest of the components in the data processing system, it will be appreciated that other embodiments may utilize a non-volatile memory which is remote from a system, such as a network storage device, which is coupled to the data processing system through a network interface, such as a modem or an Ethernet interface.

Bus 105, as is well known in the art, may include one or more buses connected to each other through various bridges, controllers, and/or adapters as is known in the art. In one embodiment, I/O controller 150 may include a USB compliant adapter for controlling USB compliant peripherals and an IEEE-1394 controller for IEEE-1394 compliant peripherals.

Figure 2:
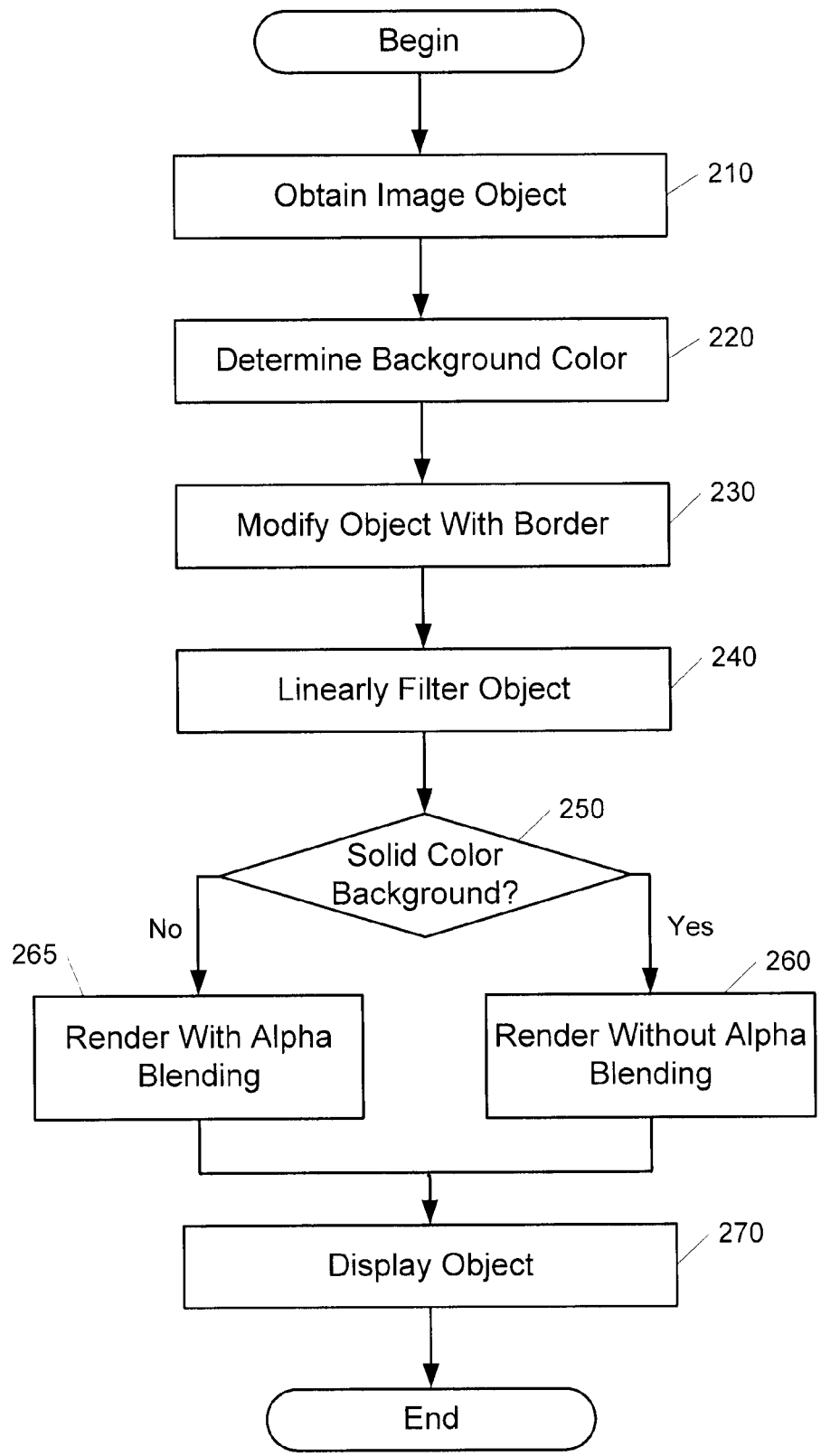
FIG. 2 is a flow diagram of one embodiment of a technique for edge anti-aliasing.

FIG. 2 is a flow diagram of one embodiment of a technique for edge anti-aliasing. The technique of FIG. 2 may be applied to any object to be displayed on a display device. In one embodiment, the image objects include album artwork, windows, dialog boxes, icons, images, etc.

An image object is obtained, 210. The image object may be obtained in any manner known in the art. For example, the image object may be retrieved from main memory or a cache memory, or the object may be obtained via a transmission. In one embodiment, the background color may be determined, 220. The background color may be determined in any manner known in the art.

The object image may be modified with a border, 230. The border generally refers to a region around or overlapping the perimeter of the object. In one embodiment, the region may be added to the edge of the original object so as to not overlap with the original object. In another embodiment, the border may partially or completely overlap the edges of the object. For an object to be displayed on a solid background, the border region may be the same (or very similar) color as the background. For other objects, the region may be transparent.

The object may be linearly filtered, 240. Linear filtering may be accomplished in any manner known in the art. One advantage to the technique described herein is that linear filtering may allow use of the graphic hardware texture sampling capabilities to smooth the transition between the object and the background. This may provide more efficient edge anti-aliasing.

If the background color is solid, 250, the object may be rendered without alpha blending 260. If the background color is not solid, 250, the object may be rendered with alpha blending 265. Various techniques for alpha blending are known in the art. The rendered object is then displayed, 270.

Figure 3:
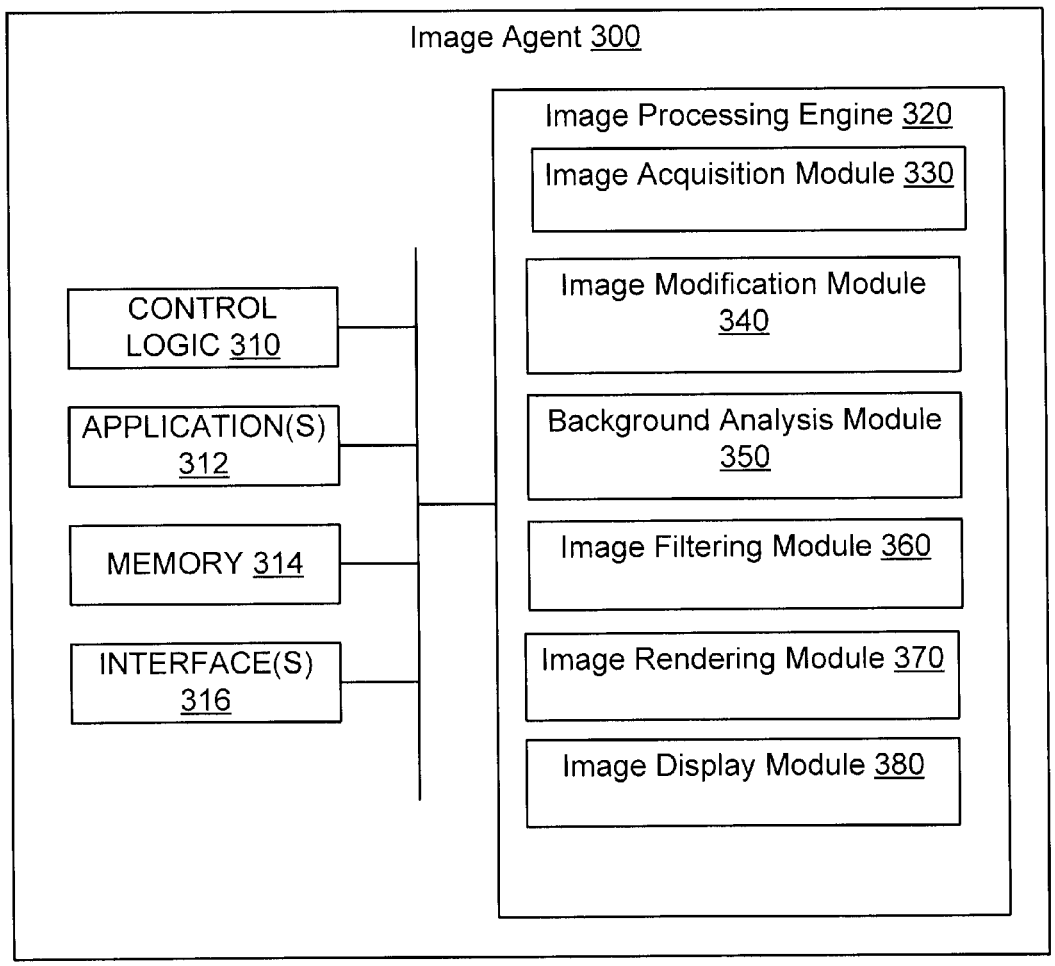
FIG. 3 is a block diagram of one embodiment of an image agent.

FIG. 3 is a block diagram of one embodiment of an image agent. Image agent 300 includes control logic 310, which implements logical functional control to direct operation of host agent 300, and/or hardware associated with directing operation of host agent 300. Logic may be hardware logic circuits, firmware and/or software routines. In one embodiment, host agent 300 includes one or more applications 312, which represent code sequence and/or programs that provide instructions to control logic 310.

Image agent 300 includes memory 314, which represents a memory device and/or access to a memory resource for storing data and/or instructions. Memory 314 may include memory local to image agent 300, as well as, or alternatively, including memory of the host system on which image agent 300 resides. Host agent 300 also includes one or more interfaces 316, which represent access interfaces to/from (an input/output interface) image agent 300 with regard to entities (electronic or human) external to image agent 300.

Image agent 300 also includes image processing engine 320, which represents one or more functions that enable image agent 300 to provide image data for display. Example modules that may be included in image processing engine 320 are image acquisition module 330, image modification module 340, background analysis module 350, image filtering module 360, image rendering module 370 and image display module 380. Each of these modules may further include other modules to provide other functions. As used herein, a module refers to routine, a subsystem, etc., whether implemented in hardware, firmware, software, or some combination thereof.

Image acquisition module 330 may retrieve, process or otherwise acquire data corresponding to the image to be displayed. Images may be stored on a disk, in a memory buffer, transmitted over a network (wired or wireless). Image acquisition module 330 may include one or more interfaces to allow the image data to be retrieved. Image modification module 340 may modify the image data such that a border is included in the image. As discussed above, the border may be around the outside perimeter of the image or the border may partially or completely overlap the image. The border may be transparent or colored. In one embodiment, the border is the same color, or very similar to a background over which the image is to be displayed.

Background analysis module 350 may determine the background color over which the image is to be displayed, if any. Background analysis module 350 may also determine whether the background is a solid color or a pattern. In one embodiment, background analysis module 350 may provide information related to the background color to image modification module 340. Image filtering module 360 may perform filtering operations on the image to be displayed. For example, image filtering module 360 may provide linear filtering functionality. Image filtering module 360 may also provide other filtering functionality.

Image rendering module 370 may provide image rendering functionality. In one embodiment image rendering module 370 may provide the ability to render an image object with alpha blending or without alpha blending. As discussed above, images displayed over a colored background color may be rendered without alpha blending while images displayed over a background that is not colored, or is not a solid color, may be rendered with alpha blending.

Image display module 380 may provide the functionality necessary to cause the modified, filtered and rendered object to be displayed on a display device such that the image may be seen by a user. The display device may be any type of display device known in the art.

Figure 4:
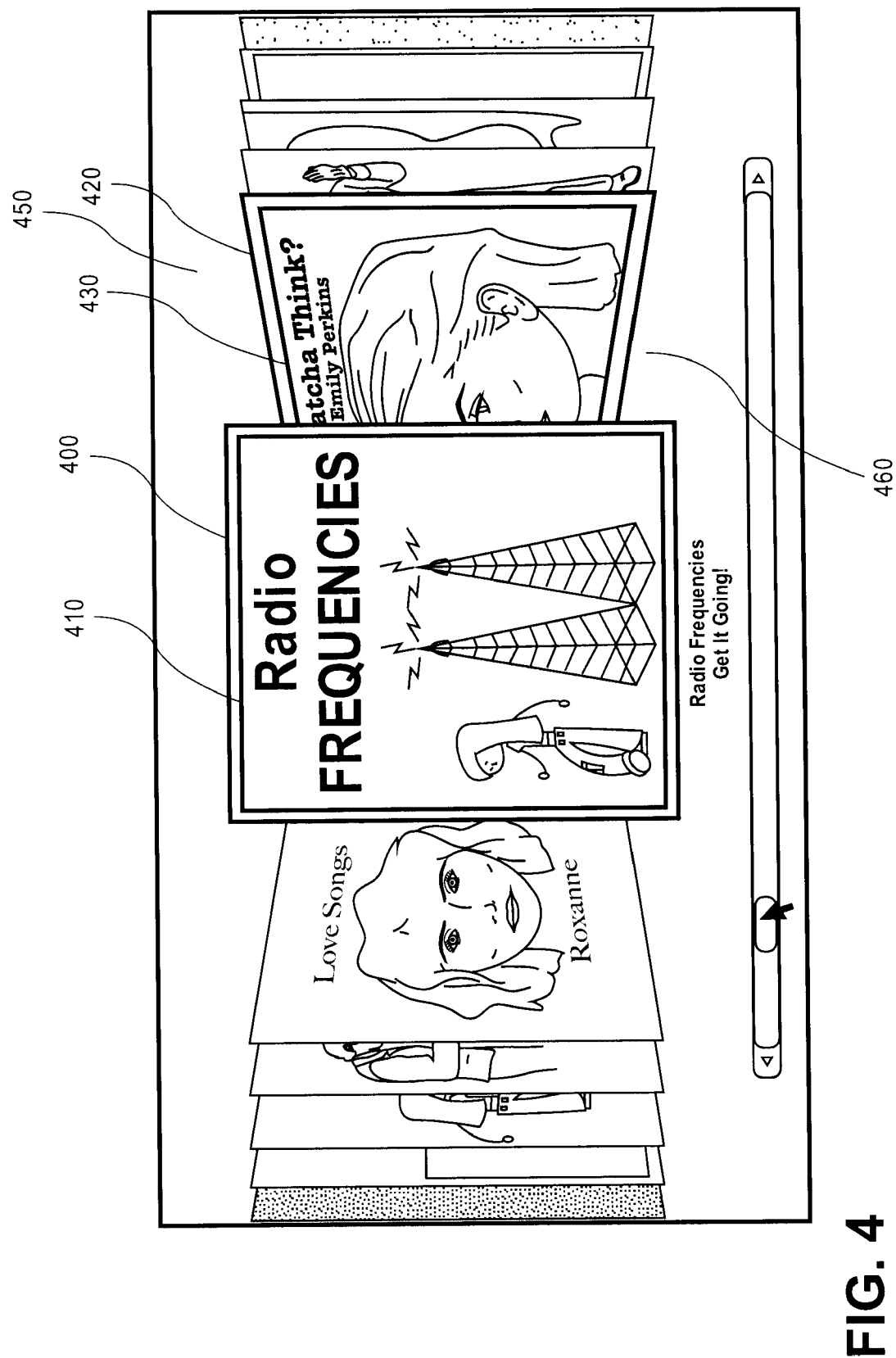
FIG. 4 is one embodiment of a graphical display where the anti-aliasing techniques described herein may be used.

FIG. 4 is one embodiment of a graphical display where the anti-aliasing techniques described herein may be used. In the example of FIG. 4, the graphical objects that may be processed using the techniques described herein include album cover art 400 and album cover art 420; however, the techniques described herein are more generally applicable. That is, the techniques described herein may be applied to any graphical object to be displayed on a display device.

Album cover art 400 may include border 410 that is processed as described above. The dimensions of the border region may vary depending on, for example, the size of the graphical object, the size of the display device, the colors to be displayed, etc. Similarly, album cover art 420 may include border 430 that is processed as described above.

In the example of FIG. 4, album cover art 400 and 420 may be displayed over a background that is either a solid color (background region 450) or a non-solid color (background region 460). In one embodiment, the border regions are treated as a single object and the background surrounding the object to be displayed is processed as a whole. In another embodiment, the border may be broken into multiple regions that may be processed independently of each other. For example, if border 410 is broken into several smaller regions, the upper region may have a different background color than the lower region.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    modifying a graphical object to be displayed on a display image to include a border region having a transparency and a texture at least partially surrounding the object, wherein a color of the border region is selected based, at least in part, on a color of a background over which the graphical object is to be displayed and the texture is from a texture palette;
    linearly filtering the graphical object; and
    causing the linearly filtered graphical object to be displayed on a display device.

2. The method of claim 1 further comprising performing alpha blending on the graphical object.

3. The method of claim 1 wherein the graphical object comprises an artistic facsimile.

4. The method of claim 3 wherein the artistic facsimile comprises album artwork.

5. The method of claim 1 wherein the color of the border region is approximately the same as the color of the background.

6. An article of manufacture comprising a tangible computer-readable medium having stored thereon instructions that, when executed, cause one or more processors to:
    modify a graphical object to be displayed on a display image to include a border region having a transparency and a texture at least partially surrounding the object, wherein a color of the border region is selected based, at least in part, on a color of a background over which the graphical object is to be displayed and the texture is from a texture palette;
    linearly filter the graphical object; and
    cause the linearly filtered graphical object to be displayed on a display device.

7. The article of claim 6 further comprising instructions that, when executed, cause the one or more processors to perform alpha blending on the graphical object.

8. The article of claim 6 wherein the graphical object comprises an artistic facsimile.

9. The article of claim 8 wherein the artistic facsimile comprises album artwork.

10. The article of claim 6 wherein the border region comprises a texture from a texture palette.

11. The article of claim 6 wherein the color of the border region is approximately the same as the color of the background.

12. An apparatus comprising:
    means for modifying a graphical object to be displayed on a display image to include a border region having a transparency and a texture at least partially surrounding the object, wherein a color of the border region is selected based, at least in part, on a color of a background over which the graphical object is to be displayed and the texture is from a texture palette;
    means for linearly filtering the graphical object; and
    means for causing the linearly filtered graphical object to be displayed on a display device.

13. The apparatus of claim 12 further comprising means for performing alpha blending on the graphical object.

14. A system comprising:
    a memory;
    one or more processors coupled with the memory to generate a graphical object for display, wherein the graphical object is modified by the one or more processors to include a border region having a transparency and a texture at least partially surrounding the object, wherein a color of the border region is selected based, at least in part, on a color of a background over which the graphical object is to be displayed and the texture is from a texture palette, and further wherein the one or more processors perform linear filtering on the modified graphical object; and
    a display device coupled with the one or more processors to display the linearly filtered graphical object.

15. The system of claim 14 further comprising performing alpha blending on the graphical object.

16. The system of claim 14 wherein the graphical object comprises album artwork.

17. The system of claim 14 wherein the border region comprises a texture from a texture palette.

18. The system of claim 14 wherein the color of the border region is approximately the same as the color of the background.

* * * * *

UNITED STATES PATENT AND TRADEMARK OFFICE
CERTIFICATE OF CORRECTION

| | | |
|---|---|---|
| PATENT NO. | : 7,849,414 B2 | Page 1 of 1 |
| APPLICATION NO. | : 11/770643 | |
| DATED | : December 7, 2010 | |
| INVENTOR(S) | : Alex Kan et al. | |

It is certified that error appears in the above-identified patent and that said Letters Patent is hereby corrected as shown below:

On the title page, item (75), in column 1, line 3, delete "San Fransisco," and insert
-- San Francisco, --, therefor.

Signed and Sealed this
Eighteenth Day of October, 2011

David J. Kappos
*Director of the United States Patent and Trademark Office*